United States Patent
Abbaspour

(10) Patent No.: US 11,947,730 B2
(45) Date of Patent: *Apr. 2, 2024

(54) GESTURE CONTROL OF A FLUID APPLICATION SYSTEM

(71) Applicant: Wagner Spray Tech Corporation, Plymouth, MN (US)

(72) Inventor: Nima Abbaspour, Salem (DE)

(73) Assignee: Wagner Spray Tech Corporation, Plymouth, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/049,485

(22) Filed: Oct. 25, 2022

(65) Prior Publication Data

US 2023/0096155 A1 Mar. 30, 2023

Related U.S. Application Data

(63) Continuation of application No. 15/931,766, filed on May 14, 2020, now Pat. No. 11,513,602.

(60) Provisional application No. 62/898,079, filed on Sep. 10, 2019.

(51) Int. Cl.
| | |
|---|---|
| *B05B 12/02* | (2006.01) |
| *B05B 12/00* | (2018.01) |
| *G06F 3/01* | (2006.01) |
| *G06F 3/16* | (2006.01) |

(52) U.S. Cl.
CPC ............ *G06F 3/017* (2013.01); *B05B 12/004* (2013.01); *B05B 12/02* (2013.01); *G06F 3/167* (2013.01)

(58) Field of Classification Search
CPC ....... G06F 3/017; G06F 3/167; B05B 12/004; B05B 12/02
See application file for complete search history.

(56) References Cited

U.S. PATENT DOCUMENTS

| | | | |
|---|---|---|---|
| 4,355,761 | A | 10/1982 | Bjorn et al. |
| 5,381,962 | A | 1/1995 | Teague |
| 5,718,767 | A | 2/1998 | Crum et al. |
| 6,758,423 | B1 | 7/2004 | Perkins et al. |
| 10,356,085 | B2 | 7/2019 | Shanks et al. |
| 10,434,525 | B1 | 10/2019 | Cooper |

(Continued)

FOREIGN PATENT DOCUMENTS

| | | |
|---|---|---|
| CN | 109070123 A | 12/2018 |
| JP | H0631214 A | 2/1994 |

(Continued)

OTHER PUBLICATIONS

Final Office Action for U.S. Appl. No. 16/744,778 dated Jan. 26, 2023, 27 pages.

(Continued)

*Primary Examiner* — Michael A Faragalla
(74) *Attorney, Agent, or Firm* — Christopher J. Volkmann; Kelly, Holt & Christenson, PLLC.

(57) ABSTRACT

A fluid application system includes a pump unit configured to pump a fluid to a fluid applicator. The fluid application system includes a sensor configured to sense a motion made by a user and generate a sensor signal indicative of the sensed motion. The fluid application system also includes a control system configured to identify a gesture based on the sensor signal and control the fluid application system based on the identified gesture.

20 Claims, 13 Drawing Sheets

(56) References Cited

U.S. PATENT DOCUMENTS

| | | |
|---|---|---|
| 11,020,767 B2 | 6/2021 | Vo et al. |
| 2005/0011967 A1 | 1/2005 | Skelton-Becker et al. |
| 2005/0048196 A1 | 3/2005 | Yanagita et al. |
| 2010/0077959 A1 | 4/2010 | Treloar et al. |
| 2011/0216188 A1 | 9/2011 | Thwing et al. |
| 2014/0061329 A1 | 3/2014 | Ngo et al. |
| 2014/0074970 A1 | 3/2014 | Nielsen et al. |
| 2014/0079652 A1 | 3/2014 | Cooper et al. |
| 2015/0277574 A1 | 10/2015 | Jain et al. |
| 2015/0378371 A1 | 12/2015 | Lange et al. |
| 2017/0110898 A1 | 4/2017 | Kyriakoulis et al. |
| 2017/0129605 A1 | 5/2017 | Wu et al. |
| 2017/0203309 A1 | 7/2017 | Krueger et al. |
| 2017/0252771 A1 | 9/2017 | Young, II |
| 2017/0254055 A1 | 9/2017 | Xia |
| 2017/0259290 A1 | 9/2017 | Kraft et al. |
| 2017/0274413 A1* | 9/2017 | Vo .......................... B29B 7/72 |
| 2017/0333859 A1* | 11/2017 | Lind .................... G05D 11/132 |
| 2018/0071792 A1 | 3/2018 | Spengler et al. |
| 2018/0192167 A1 | 7/2018 | Lange et al. |
| 2018/0193864 A1 | 7/2018 | Plantard et al. |
| 2018/0292847 A1 | 10/2018 | Lange et al. |
| 2019/0022678 A1 | 1/2019 | Donaldson |
| 2019/0047009 A1 | 2/2019 | Barker et al. |
| 2019/0100425 A1 | 4/2019 | Paar et al. |
| 2019/0105676 A1 | 4/2019 | Kahler et al. |
| 2019/0210726 A1 | 7/2019 | Wu et al. |
| 2019/0247873 A1 | 8/2019 | Schulze |
| 2019/0283062 A1 | 9/2019 | De Talhouet et al. |
| 2019/0384329 A1 | 12/2019 | Cybulsky et al. |
| 2020/0001313 A1 | 1/2020 | Bindl et al. |
| 2020/0009594 A1 | 1/2020 | Wood |
| 2020/0034622 A1 | 1/2020 | Thakurta et al. |
| 2020/0042095 A1 | 2/2020 | Ang et al. |
| 2020/0050223 A1 | 2/2020 | Lange et al. |
| 2020/0121860 A1 | 4/2020 | Uber, III et al. |
| 2020/0230632 A1 | 7/2020 | Kieffer et al. |
| 2021/0072830 A1 | 3/2021 | Abbaspour |
| 2021/0271272 A1 | 9/2021 | Vo et al. |
| 2022/0046340 A1 | 2/2022 | Lange et al. |
| 2022/0050484 A1 | 2/2022 | Lange et al. |
| 2022/0066482 A1 | 3/2022 | Lange et al. |
| 2022/0100214 A1 | 3/2022 | Lange et al. |

FOREIGN PATENT DOCUMENTS

| | | |
|---|---|---|
| JP | 2000-246167 A | 9/2000 |
| KR | 10-2008-0046756 A | 5/2008 |
| KR | 10-0926377 B1 | 11/2009 |
| WO | WO 2011006933 A1 | 1/2011 |

OTHER PUBLICATIONS

International Search Report and Written Opinion for International Patent Application PCT/US2020/013876, dated Jun. 5, 2020, date of filing: Jan. 16, 2020, 12 pages.
Application and Drawings for U.S. Appl. No. 15/931,766, filed May 14, 2020, 40 pages.
International Search Report and Written Opinion for International Patent Application No. PCT/US2020/033588, dated Aug. 31, 2020, filing date of May 19, 2020, 15 pages.
Non-Final Office Action for U.S. Appl. No. 15/931,766 dated Feb. 17, 2021, 20 pages.
Prosecution History for U.S. Appl. No. 15/931,766 including: Final Office Action dated Jul. 20, 2021, and Amendment filed Jun. 15, 2021, 33 pages.
International Preliminary Report on Patentability for International Patent Application No. PCT/US2020/013876, dated Jul. 29, 2021, 9 pages.
Non-Final Office Action for U.S. Appl. No. 15/931,766 dated Feb. 2, 2022, 17 pages.
Prosecution History for U.S. Appl. No. 16/744,778 including: Restriction Requirement dated Apr. 21, 2022, and Application and Drawings filed Jan. 16, 2020, 65 pages.
Prosecution History for U.S. Appl. No. 15/931,766 including: Amendment dated Apr. 14, 2022, Amendment with RCE dated Oct. 6, 2021, and Application and Drawings filed May 14, 2020, 68 pages.
International Preliminary Report on Patentability for International Patent Application No. PCT/US2020/033588, dated Mar. 24, 2022, 9 pages.
First Office Action for Chinese Patent Application No. 202080009522.1 dated May 11, 2022, 18 pages with English Translation.
Notice of Allowance for U.S. Appl. No. 15/931,766 dated Jul. 27, 2022, 13 pages.
Non-Final Office Action for U.S. Appl. No. 16/744,778 dated Jul. 21, 2022, 25 pages.
Search Report for European Patent Application No. 20741192.7 dated Sep. 19, 2022, 12 pages.
Second Office Action for Chinese Patent Application No. 202080009522.1 dated Dec. 8, 2022, 17 pages with English Translation.
First Office Action for Chinese Patent Application No. 202080063274.9 dated Nov. 23, 2022, 19 pages with English Translation.
Extended Search Report for European Patent Application No. 20664203.3 dated Jul. 7, 2023. 9 pages.
Second Chinese Office Action for Chinese Application No. 202080063274.9 dated Jun. 22, 2023, 12 pages with English Translation.

* cited by examiner

GESTURE CONTROL OF A FLUID APPLICATION SYSTEM

CROSS-REFERENCE TO RELATED APPLICATIONS

The present application is a continuation of and claims priority of U.S. patent application Ser. No. 15/931,766, filed May 14, 2020, which is based on and claims the benefit of U.S. provisional patent application Ser. No. 62/898,079, filed on Sep. 10, 2019, the contents of which are hereby incorporated by reference in their entirety.

BACKGROUND

In fluid application systems, different fluids (e.g., different types of paints, plural components fluids, etc.) have different physical properties that affect coverage and application patterns (e.g., spray patterns). To control an example fluid application system to achieve a desired performance, a user actuates controls (buttons, dials, switches, etc.) on a pump unit that pumps the fluid through a length of hose to an applicator.

The discussion above is merely provided for general background information and is not intended to be used as an aid in determining the scope of the claimed subject matter. The claimed subject matter is not limited to implementations that solve any or all disadvantages noted in the background.

SUMMARY

A fluid application system includes a pump unit configured to pump a fluid to a fluid applicator. The fluid application system includes a sensor configured to sense a motion made by a user and generate a sensor signal indicative of the sensed motion. The fluid application system also includes a control system configured to identify a gesture based on the sensor signal and control the fluid application system based on the identified gesture.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

While the above-identified figures set forth one or more examples of the disclosed subject matter, other examples are also contemplated, as noted in the disclosure. In all cases, this disclosure presents the disclosed subject matter by way of representation and not limitation. It should be understood that numerous other modifications and examples can be devised by those skilled in the art which fall within the scope and spirit of the principles of this disclosure.

DETAILED DESCRIPTION

Many fluid application systems include a stationary or mobile pump unit (e.g., carried on a cart, etc.) that is separate from a user-held applicator (e.g., a spray gun, plural component gun, fluid dispenser, caulk gun, power roller, etc.) by a length of hose. The pump unit typically includes a plurality of settings that a user can select through user interface (UI) controls, such as pressure, heating, throughput, etc. Often, the UI controls (e.g., a touchscreen, buttons, switches, knobs, etc.) are located on the pump unit. This requires the user to cease the fluid application operation and walk back to the pump unit to interact with the controls to change the various settings.

In accordance with examples of fluid application systems described herein, a user controls the various settings of the fluid application system (e.g., pump unit settings, such as pressure changes, power on/off, heating, plural component ratios, etc.) via gestures, voice commands, and/or some combination of gestures and voice controls. For instance, the fluid application system includes movement sensor(s) such as, but not limited to, a gyroscope, accelerometer, inertial measurement unit (IMU), camera or other sensor configured to detect movement of the user, applicator and/or other components of the system. For example, sensor(s) located on the applicator detect gestures made by the user with the applicator which are translated into control of the pump or other aspects of the fluid application system.

Alternatively, or in addition, the fluid application system includes acoustic sensor(s), such as microphones or other sensors, that detect speech of the user. For example, a microphone located on the applicator or pump unit detects a voice command made by the user which are translated into control of the pump or other aspects of the spraying system.

Figure 1:
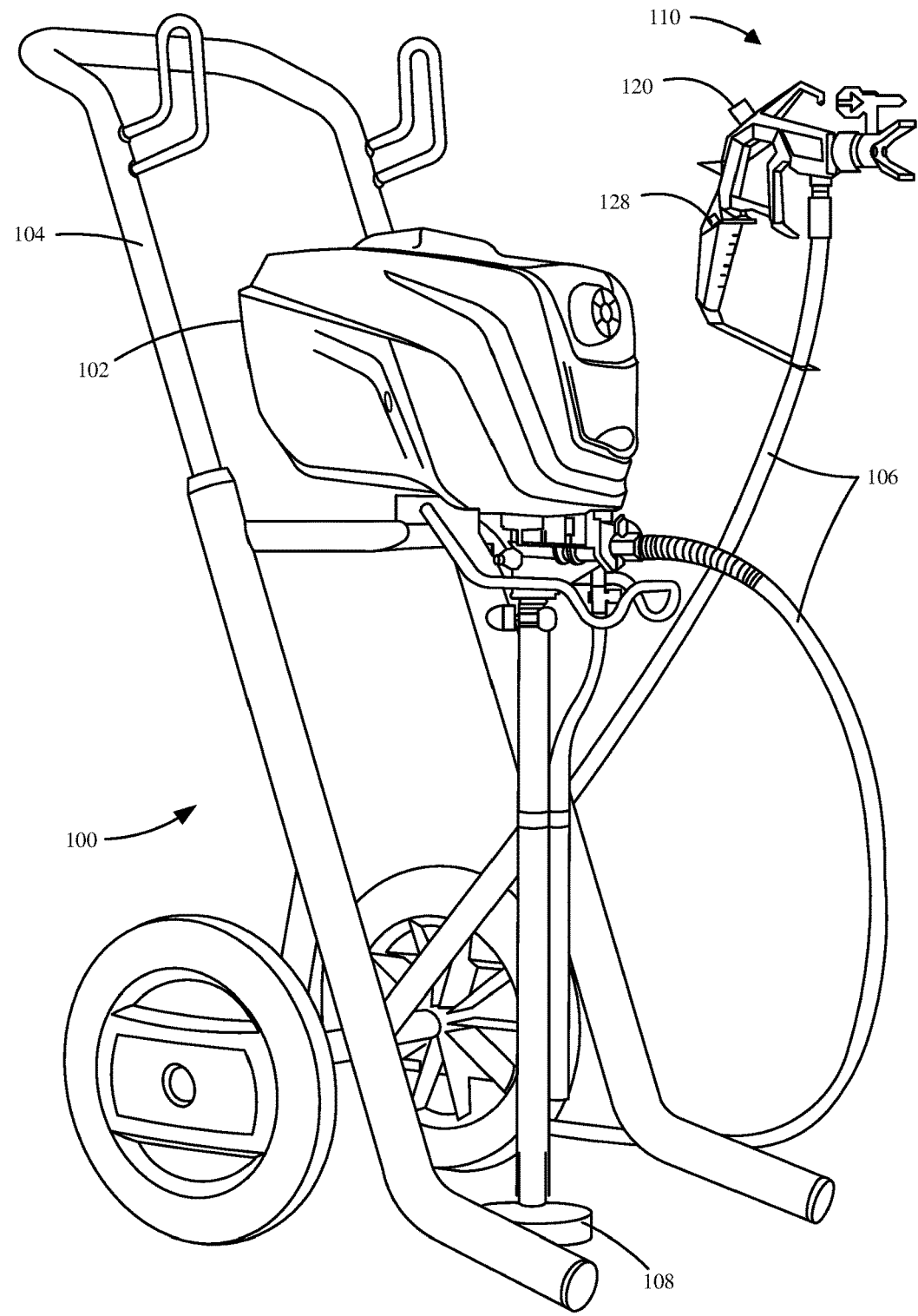
FIG. 1 is a perspective view showing an example spraying system.

FIG. 1 is a perspective view showing an example fluid application system. The following describes a fluid application system in the context of a spraying system (referred to as spraying system 100) configured to spray a fluid (e.g., paint) onto a surface. However, the present features can be applied in other types of fluid application systems, such as a power roller, a plural component gun, a fluid dispenser, a caulk gun, etc.

Spraying system 100 includes a pump unit 102 that is mounted on a cart 104 and couples to an applicator 110 through a hose 106. Pump unit 102 includes a fluid intake 108 that is disposed within, or otherwise receives fluid from, a fluid source (e.g., a bucket of paint). Pump unit 102 pumps the fluid, from the fluid source through a fluid intake 108 at a given pressure to applicator 110 through hose 106.

In some examples, an electronic device (e.g., smart phone, tablet, PC, etc.) interfaces with the pump through a wired or wireless connection. An internet or other network connection of the electronic device can be used to update the software/firmware of the spraying system 100. In other examples, spraying system 100 directly connects to the internet. The electronic device can also provide a user interface for a user to control and/or monitor operations of the spraying system 100. For example, setting fluid pressure, entering cleaning mode, tracking fluid throughput, etc.

Additionally, as shown in FIG. 1, one or more sensor(s) 120 are configured to sense control actions made by a user. For example, control actions include user gestures (e.g., made with the hand holding applicator 110), as well as user voice inputs.

Examples of sensor(s) 120 include an accelerometer and/or a gyroscope which generate signals indicative of position, orientation, and/or movement of applicator 110, e.g., as a result of movement of the user's hand that is holding applicator 110. These signals are received and processed by a processing unit or control system and identified as a gesture. An example gesture includes a predefined set of movements, rests, and/or rotations of applicator 110, another component of spraying system 100, or a body part of the user. Each gesture used to control spraying system 100 has one or more corresponding control signals that are indicative of an action or setting of spraying system 100. For instance, a user makes a specific gesture that changes an operation of the system, e.g., pump pressure increase/decrease, toggle power on/off, etc.

A user interface mechanism 128 is also coupled to applicator 110. In one example, user interface mechanism 128 is actuated before sensor(s) 120 begin detecting (or controlling the pump based on) gestures. This prevents normal movement of applicator 110 during a spraying operation as being interpreted as a gesture command that is used to control pump unit 102. As shown, user interface mechanism 128 is a button. However, in other examples, user interface mechanism 128 includes other items as well, such as touch screens, switches, etc.

In addition, or in the alternate, sensors(s) 120 include acoustic sensors that sense, amongst other things, a user's voice. This allows a user to make voice commands that change operations of the spraying system. For example, a user speaks the words "change the pressure to two thousand psi" and the system will adjust the pump pressure to two thousand psi (pounds per square inch). In some examples, one of user interface mechanism(s) 121 is actuated before sensor(s) 120 begin detecting, or controlling the pump based on, voice commands.

Figure 2:
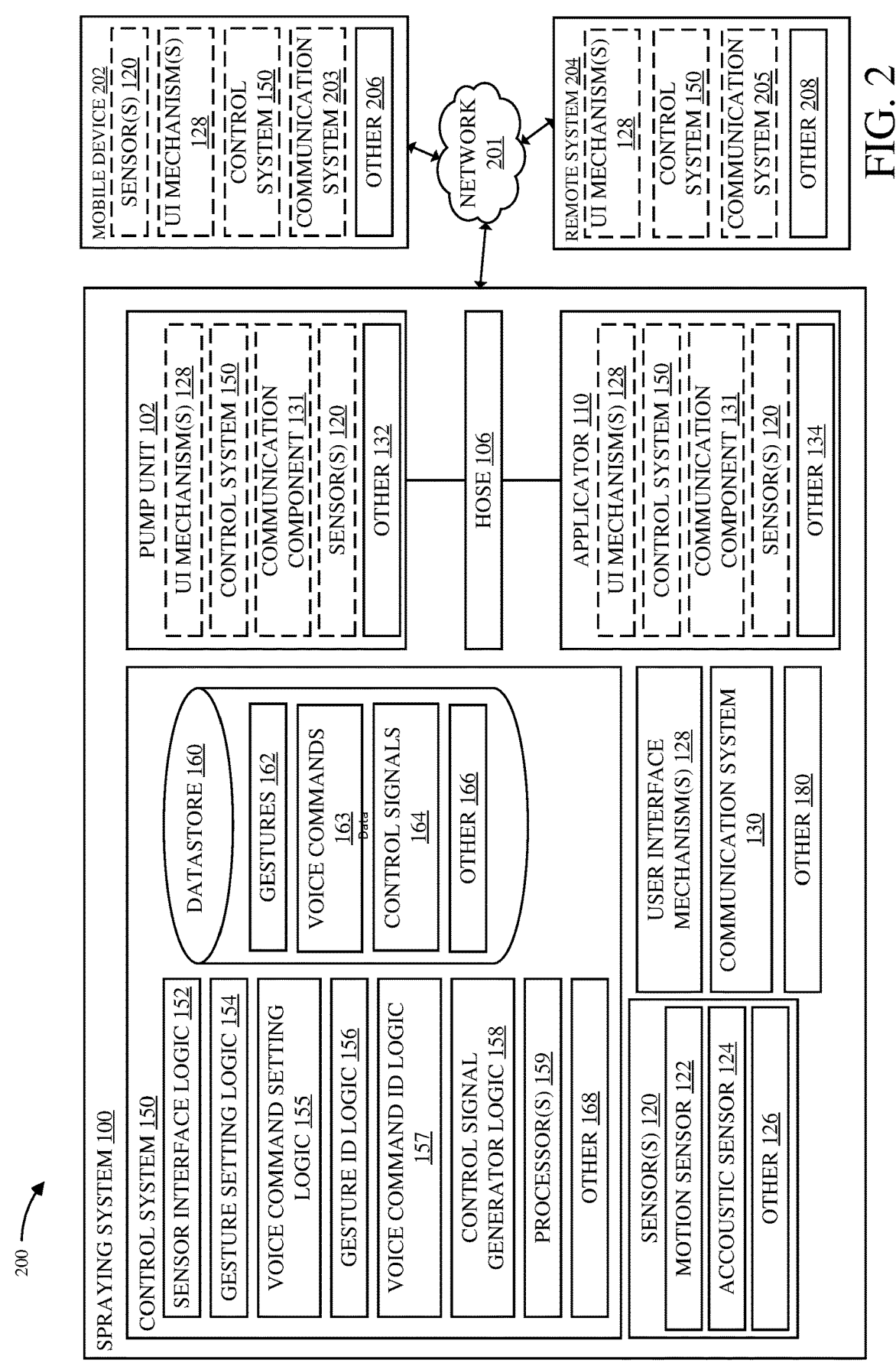
FIG. 2 is a block diagram showing the example spraying system.

FIG. 2 is a block diagram showing an example environment 200 that includes spraying system 100. Spraying system 100, as shown, includes pump unit 102, hose 106, applicator 110, sensors 120, user interface mechanisms 128, a communication system 130, control system 150 and can include other items as well, as indicated by block 180. For instance, in an example plural component application, spraying system 100 can include a heating element, a mixing device, an additional pump, etc.

Communication system 130 is configured to communicate with other systems and devices in environment 200, either directly or over a network 201. For example, communication system 130 can communicate with a mobile device 202 (having a corresponding communication system 203) and/or a remote system 204 (having a corresponding communication system 205), using suitable wired or wireless connections and communication logic. Also, pump unit 102 and applicator 110 can include corresponding communication components 131 configured to communicate with other components in environment 200.

Network 201 can be any of a wide variety of different types of networks including, but not limited to, a wide area network, such as the Internet, a cellular communication network, a local area network, a wired bus, a near field communication network, or any of a wide variety of other networks or combinations of networks or communication systems.

As shown by the corresponding dashed blocks in FIG. 2, one or more components or features described with respect to UI mechanisms 128 and/or control system 150 can be provided on mobile device 202 and/or remote system 204. Mobile device 202 can include other items 206. Similarly, remote system 204 can include other items 208.

User interface mechanism(s) 128 include items configured to receive user input and/or generate output (e.g., audible, visual, haptic) to the user, such as knobs, buttons, touch screens, switches, audio devices, speakers, microphones, etc. User interface mechanism(s) 128 can be electronic (e.g., touch screen, button, etc.) and/or mechanical (e.g., valve, lock, etc.).

As shown by the corresponding dashed blocks in FIG. 2, user interface mechanism(s) 128 can also optionally be disposed on pump unit 102, applicator 110 or other places (e.g., mobile device 202 or remote systems 204).

As noted above, applicator 110 receives a fluid from pump unit 102 through hose 106. Various settings of pump unit 102 are controlled by control system 150 (e.g., pump pressure, throughput, heating, cleaning vs. spraying modes, etc.). Control system 150 includes sensor interface logic 152, gestures setting logic 154, voice command setting logic 155, gesture identification logic 156, voice command identification logic 157, control signal generator logic 158, one or more processors 159, a datastore 160, and can include other items as well, as indicated by block 168. In one example, processor(s) 159 implement the functions of the logic components of control system 150 and accesses and modifies data in data store 160.

Sensor interface logic 152 receives and processes signals from sensor(s) 120. As illustrated in FIG. 2, sensor(s) 120 can be provided on one or more of pump unit 102, applicator 110, and mobile device 202. Also, sensor(s) 120 can be separate from those components. For example, a stand-alone camera monitors motions made by a user from a distance.

In one example, sensor interface logic 152 receives an analog signal from sensor(s) 120 and convert that signal into a digital signal. Sensor interface logic 152 can, of course, process a signal received from sensor(s) 120 in other ways as well. For example, when receiving a microphone sensor signal, noise in the signal is removed or filtered. Sensor(s) 120 include motion sensor(s) 122, acoustic sensor(s) 124 and can include other sensors as well, as indicated by block 126.

Motion sensor(s) 122 can include a wide variety of sensors that sense a motion made by a user of spraying system 100. For example, motion sensor(s) 122 can include gyroscopes, accelerometers, IMU's, cameras, optical sensors, LiDAR, etc. As shown in FIGS. 1 and 2, motion sensor(s) 122 can be located on applicator 110, however in other examples, motion sensor(s) 122 can be located elsewhere, such as on hose 106, pump unit 102, mobile device 202 or elsewhere. For example, motion sensor 122 includes a camera and/or LiDAR array located remotely from applicator 110, hose 106 and pump unit 102. Motion sensor(s) 122 can communicate with pump unit 102, processor(s) 159 or other components via a wired communication (e.g., a cable extending along hose 106) or a wireless communication (e.g., via Bluetooth).

Gestures setting logic 154 sets which gestures (e.g., gestures 162) correspond to which control signals (e.g., control signals 164). For example, gestures setting logic 154 creates an interface where a user selects a gesture and corresponds that gesture to a control signal. In another example, gestures setting logic 154 allows a user to create a new or custom gesture (e.g., by monitoring and saving the sensor feedback as a user completes the custom gesture) and correspond that gesture to a chosen control signal 164. Gesture setting logic 154 can, of course, correspond or map a gesture to a control signal in other ways as well. Gesture setting logic 154 stores this data as gestures 162 in data store 160.

Gesture identification logic 156 receives sensor signals from motion sensor(s) 122 and identifies a gesture being made by a user that corresponds to a gesture 162 in datastore 160 and/or to a control signal 164. For example, shaking the gun in a pre-defined manner corresponds to a control signal that turns off the pump.

In some examples, a characteristic (e.g., the degree, amplitude and/or force) of the gesture indicates an amplitude of the desired control signal action. For instance, making the gesture slowly or with less vigor increases pump unit 102 pressure a first amount (e.g., fifty psi) and making the gesture more vigorously increases pump unit 102 pressure by a larger amount (e.g., five-hundred psi). In another example, the angle the applicator is tilted is used to determine how much the pressure should be increased (e.g., a forty-five-degree tilt increases pressure by one hundred psi, a ninety-degree tilt increases pressure by two-hundred and fifty psi, etc.).

In some examples, the duration of time the gesture is being made indicates an amplitude of the desired control signal action. For instance, making the gesture for one second increases the pressure a little (e.g., fifty psi) and making the gesture for five seconds increases the pressure more (e.g., two-hundred and fifty psi). Of course, during this the user could be notified as the pressure continues to change.

Gesture identification logic 156 accesses data store 160 and identifies a control signal 164 that corresponds to the identified gesture 162. Gesture identification logic 156 sends an indication of the identified control signal to control signal generator logic 158 which can generate and send the control signal to implement the action or settings change.

Voice command setting logic 155 sets which voice commands correspond to which control signals. For example, voice command setting logic 155 creates an interface where a user selects or speaks a voice command and corresponds that voice command to a control signal. In another example, voice command setting logic 155 allows a user to create a new or custom voice command (e.g., by "recording" the sensor feedback as a user speaks the voice command) and corresponds that voice command to a chosen control signal 164. Voice command setting logic 155 stores this data as voice commands 163 in data store 160.

Voice command identification logic 157 receives sensor signals from sensor(s) 120 (e.g., acoustic sensor 124) and identifies a voice command being made by a user that corresponds to a voice command 163 in datastore 160. For example, a voice command includes speaking a number that will translate to a pressure to set the pump at. In another example, a voice command includes speaking 'increase pressure' or 'decrease pressure' to increase or decrease pressure by some pre-defined amount or an amount that could also be spoken.

Control signal generator logic 158 generates and sends a control signals to components of spraying system 100 (e.g., pump unit 102). For example, control signal generator logic 158 generates and/or sends a control signal that increases the working pressure of pump unit 102. Or for example, control signal generator logic 158 generates a control signal that powers down (e.g., deactivates) pump unit 102.

Data store 160, as shown, includes gestures 162, voice commands 163, control signals 164 and can include other items as well, as indicated by block 166. An example, gesture 162 includes data indicative of a series of motions that is mapped to a corresponding control signal 164. For example, a gesture can include waving applicator 110 side to side or up and down, or tilting applicator 110 in a given direction. In some examples, the user makes a different gesture that is capture by a camera or other motion sensor 122 and gesture 162 stores information that could be used to identify this type of visually captured gesture. Voice commands 163 include data indicative of a series of audible sounds (e.g., a series of words). For example, voice command 163 includes speaking the words 'turn pump off' which causes logic 158 to generate a control signal that turns off pump unit 102. Control signals 164 include data indicative of a control action or a setting of pump unit 102 (or some other component of spraying system 100). For instance, some control actions include changes to pump pressure, pump throughput, heater temperature, plural ratios, other settings, etc.

Figure 3A:
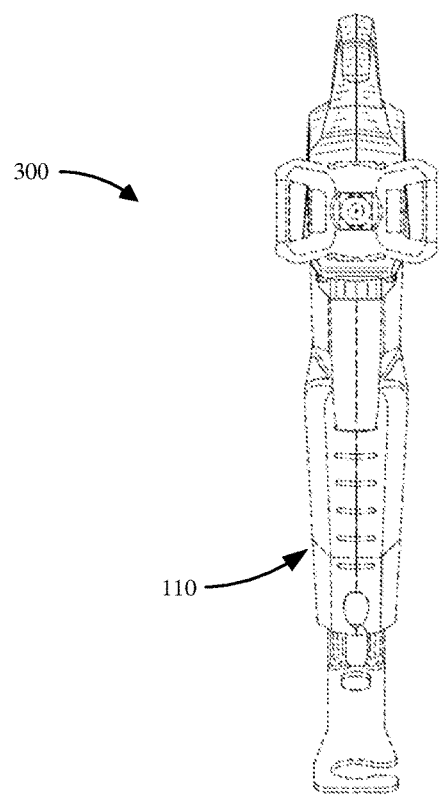
FIGS. 3A-C are front plan views showing example orientations of a spray system.
Figure 3B:
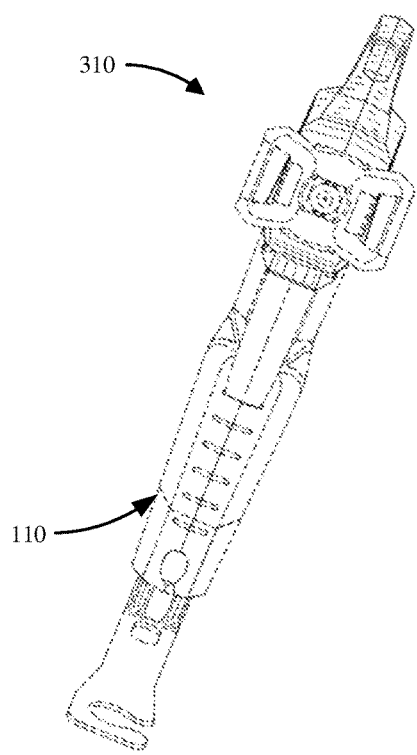
Figure 3C:
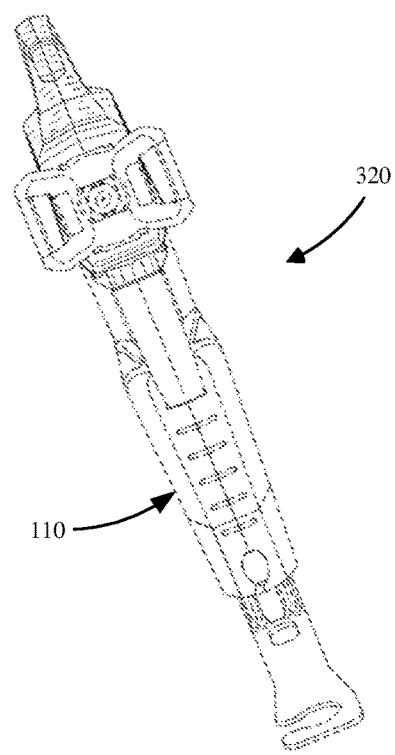

FIGS. 3A-C are front plan views showing example orientations of an applicator. In FIG. 3A, applicator 110 is in an upright orientation 300. Applicator 110 is actuated between orientation 310 in FIG. 3B and orientation 320 in FIG. 3C. These movements can be sensed by a sensor proximate or coupled to applicator 110 and a corresponding control signal generated (e.g. pressure reduced) and its corresponding action taken. In one example, moving applicator 110 from orientation 300 to orientation 310 increases pressure while moving applicator 110 from orientation 300 to orientation 320 decreases pressure.

Figure 4A:
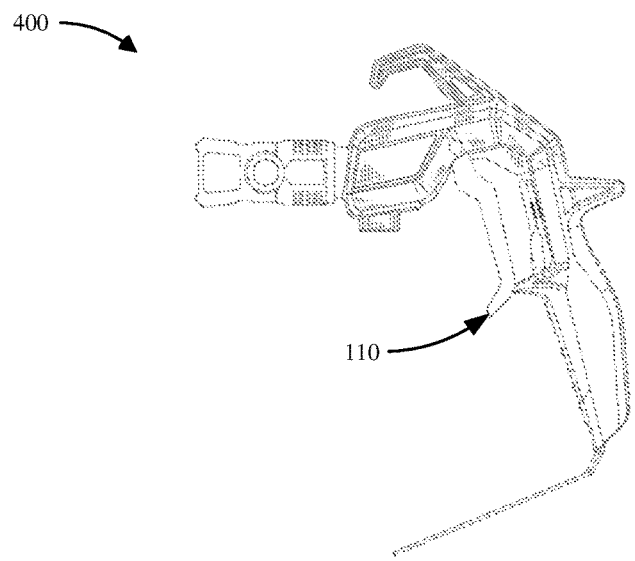
FIGS. 4A-C are side plan views showing example orientations of a spray system.
Figure 4B:
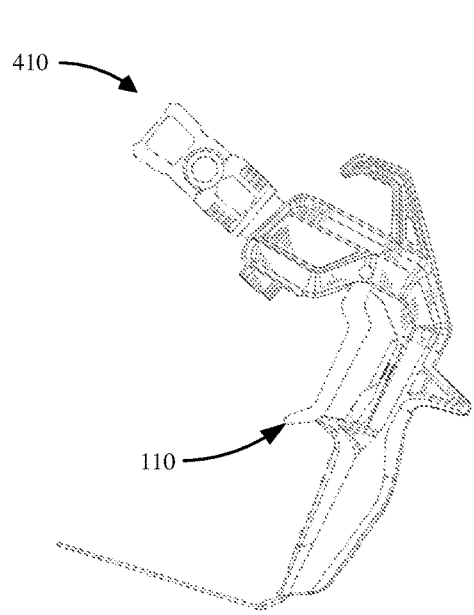
Figure 4C:
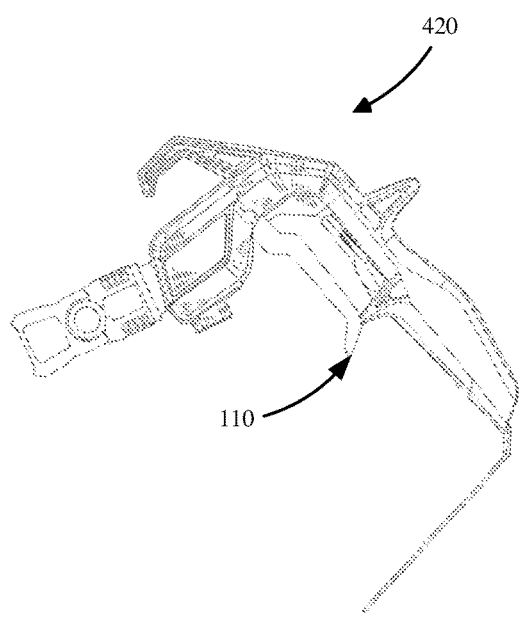

FIGS. 4A-C are side plan views showing example orientations of an applicator. FIG. 4A shows applicator 110 in an upright orientation 400. Applicator 110 is actuated between orientation 410 in FIG. 4B and orientation 420 in FIG. 4C. These movements can be sensed by a sensor proximate or coupled to applicator 110 and a corresponding control signal generated (e.g. pump heating increased) and its corresponding action taken. In one example, moving applicator 110 from orientation 400 to orientation 410 turns the pump on while moving applicator 110 from orientation 400 to orientation 420 turns the pump off.

Figure 5A:
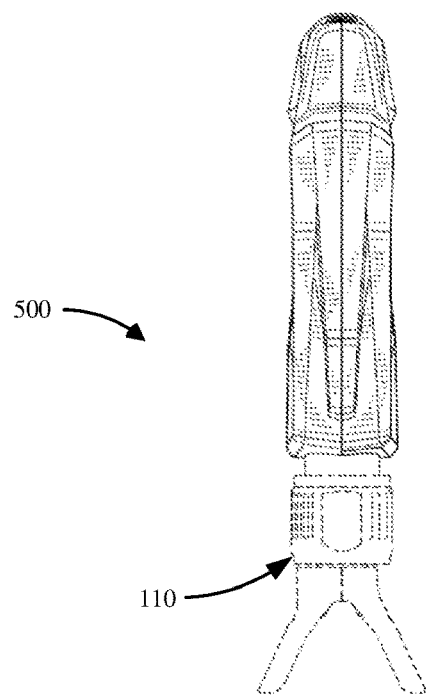
FIGS. 5A-C are top plan views showing example orientations of a spray system.
Figures 5B, 5C:
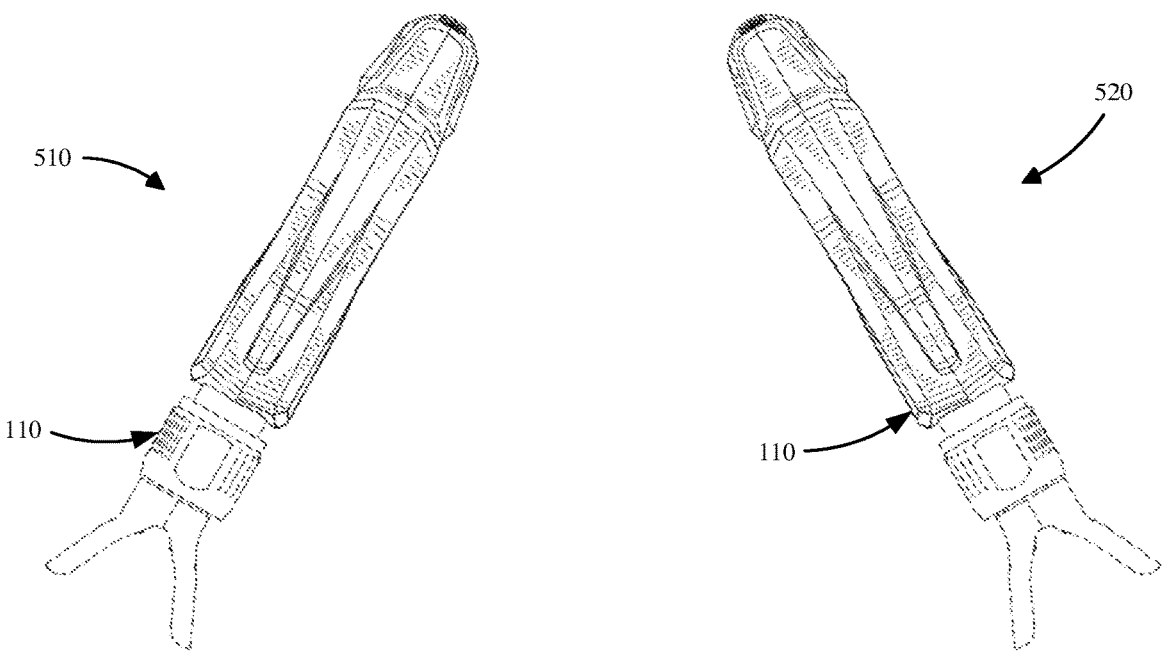

FIGS. 5A-C are top plan views showing example orientations of an applicator. FIG. 5A shows applicator 110 in an upright orientation 500. Applicator 110 is actuated between orientation 510 in FIG. 5B and orientation 520 in FIG. 5C. These movements can be sensed by a sensor proximate or coupled to applicator 110 and a corresponding control signal generated (e.g. pump cleaning mode enabled) and its corresponding action taken. In one example, gesturing applicator 110 from orientation 510 to orientation 520 turns the pump into a closed cycle mode while gesturing applicator 110 from orientation 520 to orientation 510 turns the pump into a normal (e.g., open cycle) mode.

Figure 6A:
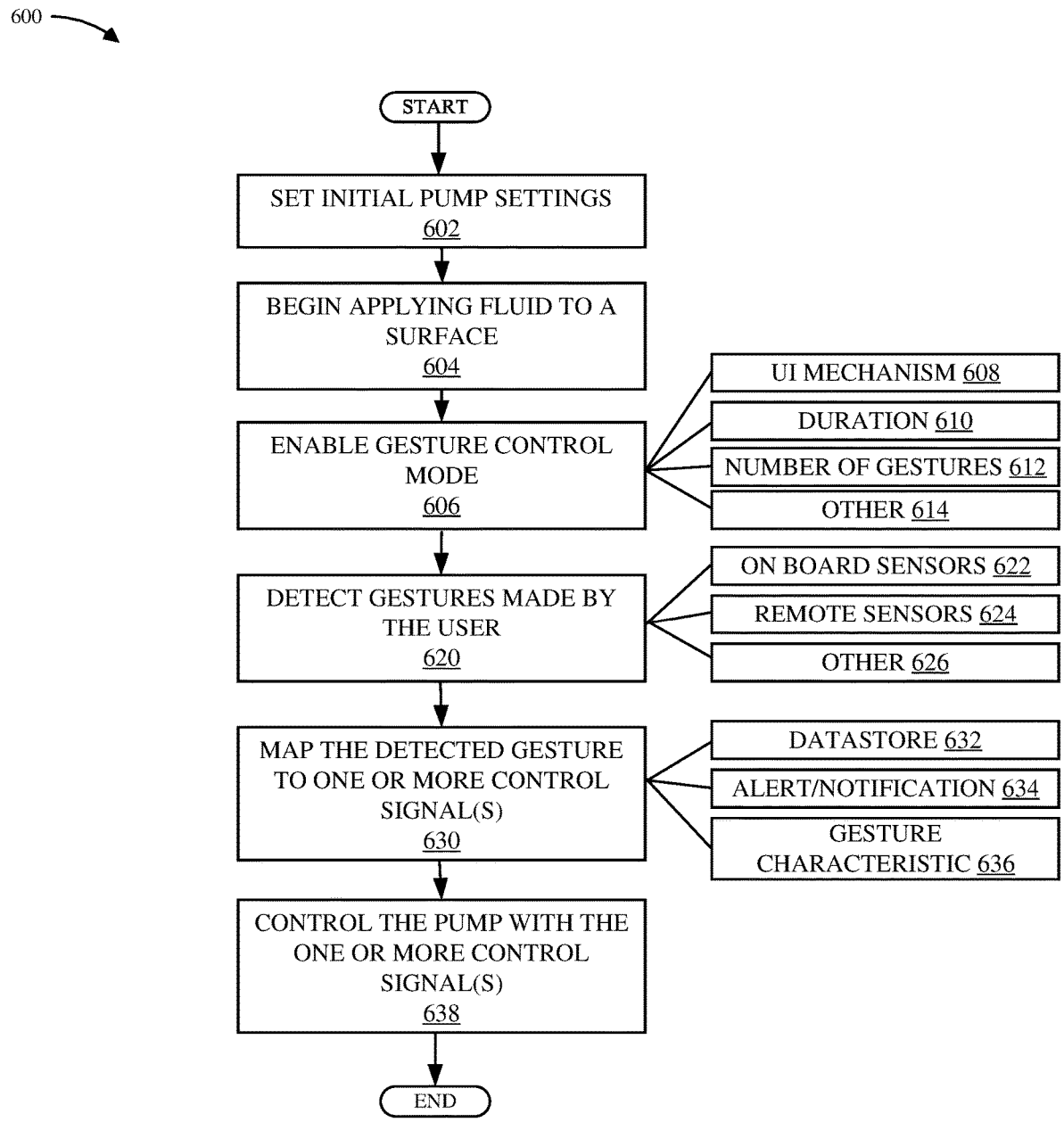
FIGS. 6A-B are flow diagrams showing example spraying operations.

FIG. 6A is a flow diagram showing an example spraying operation 600. Operation 600 begins at block 602 where a user sets the initial pump settings. For example, an initial setting is set by actuating a mechanism, such as a knob, on pump unit 102 to set an initial pump pressure.

Operation 600 proceeds at block 604, where the spraying operation begins to apply a fluid to a surface. For instance, at block 604, paint begins being expelled from a spray gun towards a surface.

Operation 600 proceeds at block 606 where a gesture control mode is enabled. When the gesture control mode is enabled, control system 150 is configured to detect gestures and control components of spraying system 100 (e.g., gestures made by a user change settings of the pump or other components). When gesture control mode is disabled, movements are not detected as gestures to control the spraying system 100. When gesture control mode is disabled motion sensors are powered down/deactivated motion sensor signals are disregarded or control based on gestures is disabled in other ways.

In one example, the gesture control mode is toggled from an enabled state to a disabled state by the user actuating a button or other user interface mechanism 128, as indicated by block 608. This way, the user does not accidentally make a gesture during spraying that initiates a control command, such as changing the pressure.

In other examples, the gesture control mode is enabled for a given duration after it is enabled as indicated by block 610. For instance, when the user actuates mechanism 128, the gesture control mode is enabled for a predefined amount of time (e.g., 3 seconds). In another example, gesture control mode is enabled as long as the user actuates user interface mechanism 128 (e.g., for the duration that the button is held down).

Alternatively, or in addition, when enables gesture control mode it is enabled until a number of gestures are detected (e.g., one gesture is detected), as indicated by block 612.

Of course, gesture control mode can be enabled in other ways as well, as indicated by block 614. For instance, gesture control mode is activated automatically when applicator 110 is not actively spraying. Alternatively, or in addition, gesture control mode is enabled by making a specific gesture or speaking a specific voice command.

Operation 600 proceeds at block 620 where one or more movements are detected by a sensor. In some examples, not only is the gesture sensed, but the duration the gesture is made, force the gesture is made with, or other characteristic of the gesture sensed. As indicated by block 622, sensor(s) 120 include on-board sensors such as gyroscopes, accelerometers or IMU's that are coupled to a portion of spraying system 100, e.g., applicator 110. As indicated by block 624 remote sensors are used to detect the gesture, such as, cameras, lidar arrays, timers, etc. These sensors need not be coupled to applicator 110 but can be aimed in a direction of the user of applicator 110. As indicated by block 626, other types of sensors could be used as well.

Operation 600 proceeds at block 630 where the detected movements are identified as gestures that correspond to one or more control signals. As indicated by block 632, gesture identification logic 156 accesses datastore 160 and looks up the control signals 152 that correspond to the identified gestures. For instance, a rotation of applicator 110 is identified as a gesture 162 which corresponds to a control signal 152 that increases pump pressure.

As indicated by block 636, the user is alerted or notified of the identification. If the detected movement is mapped successfully to a gesture and control signal, then the user is notified (visually, audibly, hapticly, or otherwise) that the gesture was made successfully. Similarly, if the detected movement is not identified as corresponding to a gesture and/or control signal, then the user is notified (visually, audibly, haptically, or otherwise) that the gesture was unsuccessful.

As indicated by block 636, a parameter of the control signal is defined by sensed characteristics of the gesture. For example, the parameter is based on the duration the gesture is made, the force the gesture is made with, or other characteristic of the gesture. For instance, in the case of a user making a tilting gesture for a given amount of time, the pressure continues to increase the longer the user continues making the gesture (or continues holding a button down that enables gesture control mode). In another example, the duration that mechanism 128 is actuated defines the control signal parameter. For instance, the pump pressure is continually increased (or decreased) until the user releases (or otherwise deactivates) mechanism 128. This, of course, could be accompanied by audio or other alerts notifying the user as the pressure is being increased during the gesture time period.

Operation 600 proceeds at block 638 where the pump is controlled to complete the actions corresponding to the identified control signals 152. For example, turning the pump on or off or adjusting the pressure. In some examples, an audible, haptic, visual, or other notification alerts the user that they made a gesture and the system is going to perform or performing a change.

Figure 6B:
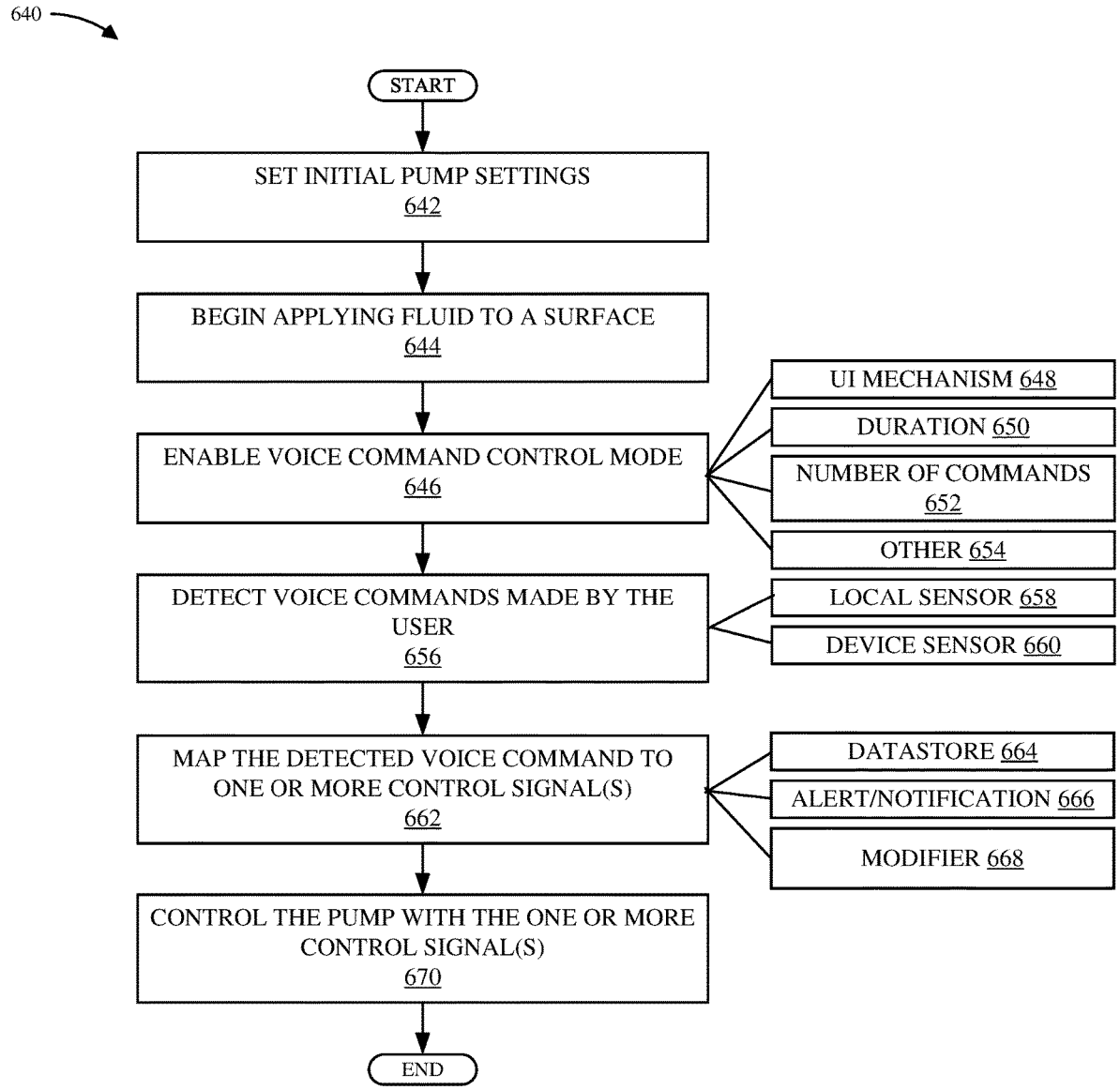

FIG. 6B is a flow diagram showing an example spraying operation 640. Operation 640 begins at block 642 where a user sets the initial pump settings. For example, an initial setting is set by actuating a mechanism, such as a knob, on pump unit 102 to set an initial pump pressure.

Operation 640 proceeds at block 644, where the spraying operation begins to apply a fluid to a surface. For instance, at block 644, paint begins being expelled from a spray gun towards a surface.

Operation 640 proceeds at block 646 where voice command control mode is enabled. When voice command control mode is enabled, voice commands made by a user changes settings of the pump or other spraying components. Example voice commands include 'turn on the pump' or 'spray', 'turn off the pump' or 'stop', 'recirculate', 'stop' (when recirculation mode is on).

When voice command control mode is disabled, user voice commands are not detected as voice commands to control the spraying system 100. For example, when voice command control mode is disabled the voice command sensor is powered down, the voice commands sensor signals are disregarded, or is disabled in other ways.

As indicated by block 648, voice command control mode is toggled from a disabled state to an enabled state by the user actuating a button or other user interface mechanism 128. This way, the user does not accidentally make a voice command during spraying that initiates a control command, such as changing the pressure.

As indicated by block 650, the voice command control mode is enabled for a given duration after being enabled. For instance, when the user actuates mechanism 128, the voice command mode is enabled for a predefined amount of time (e.g., three seconds). In another example, voice command control mode is enabled as long as the user actuates user interface mechanism 128 (e.g., for the duration that the button is held down). Alternatively, or in addition, when the user actuates mechanism 128, the voice command mode is enabled until a number of voice command(s) are detected (e.g., one voice command is detected), as indicated by block 652.

Of course, voice command control is enabled in other ways as well, as indicated by block 654. For instance, voice command control mode is activated automatically when applicator 110 is not actively spraying. Or for instance, voice command control mode is enabled by making a specific gesture or speaking a specific voice command.

Operation 640 proceeds at block 656 where voice commands are detected by a sensor (e.g., acoustic sensor 124). As indicated by block 658, local sensors located on components of spraying system 100 are used, e.g., on applicator 110. In other examples, a different type of sensor could be used to detect the voice command, e.g., a sensor on a mobile device, a wearable device, or other device, as indicated by block 660.

Operation 640 proceeds at block 662 where the detected voice commands are identified as corresponding to one or more control signals. For example, voice command identification logic 157 accesses datastore 160 and looks up the control signals 152 that correspond to the identified voice commands, as indicated by block 664. For instance, a control signal 152 corresponds to an increase in pump pressure.

As indicated by block 666, the user is alerted or notified of the identification. If the detected voice command is mapped or otherwise identified successfully to a control signal, then the user is alerted or notified (visually, audibly, haptically, or otherwise) that the voice command was made successfully. Similarly, if the detected voice command is not identified as corresponding to a control signal, then the user is alerted or notified (visually, audibly, haptically, or otherwise) that the voice command was unsuccessful.

As indicated by block 668, a parameter of the control signal is defined by a modifier in the voice command. For example, a voice command includes a generic default increase or decrease pressure (e.g., speaking "increase pressure") or includes a modification the user speaking a specific number to increase or decrease the pressure (e.g., speaking "increase pressure 40 psi).

Operation 640 proceeds at block 670 where the pump is controlled to complete the actions corresponding to the identified control signals 152. For example, turning the pump on or off. In some examples, an audible, visual, haptic, or other notification alerts the user that they made a voice command and the system is going to perform a change.

Figure 6C:
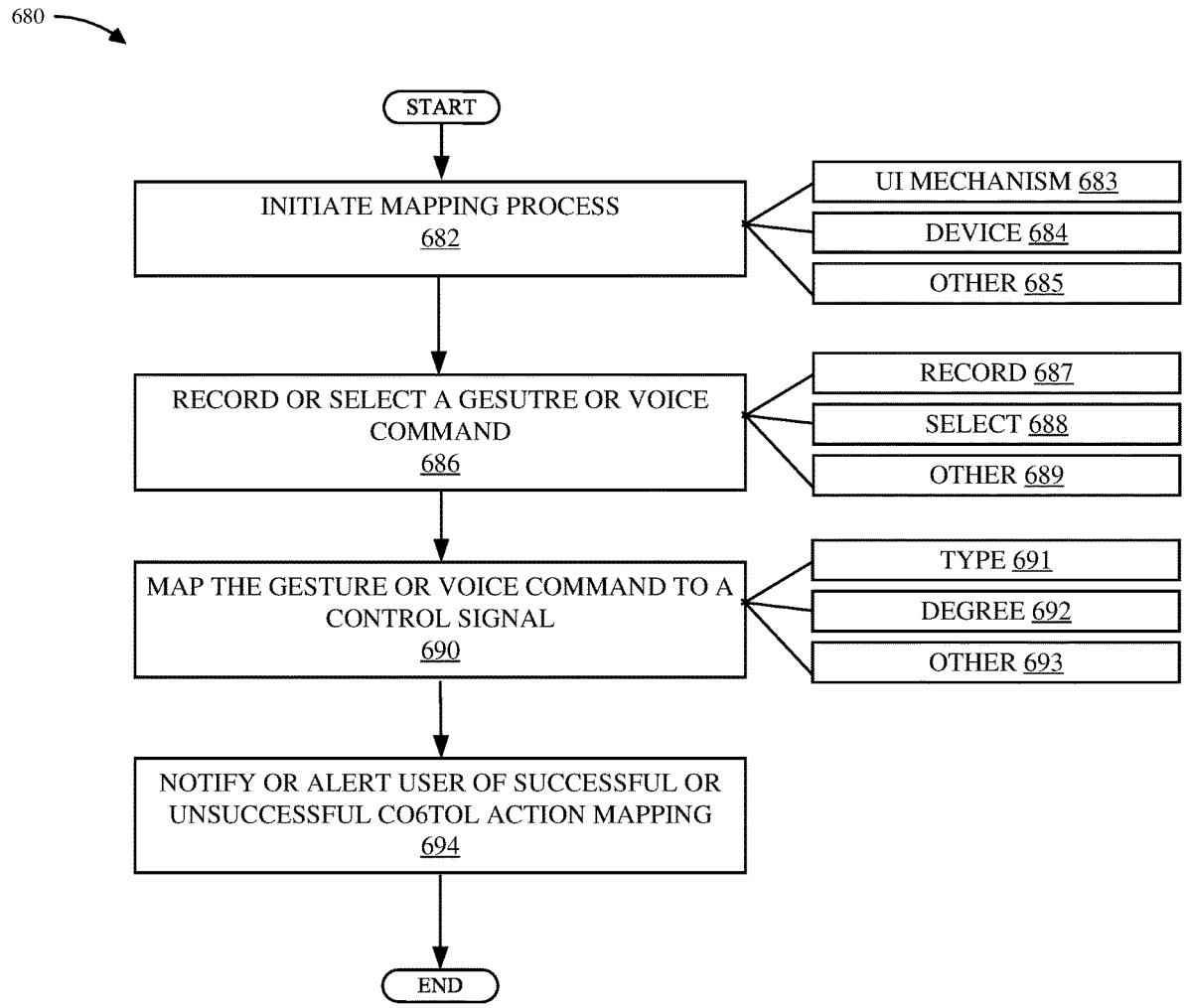
FIG. 6C is a flow diagram showing an example control mapping operation.

FIG. 6C is a flow diagram showing an example control action mapping operation 680. Control mapping operation 680 allows a user to create new or custom gesture or voice commands that will correspond to a control signal that controls spraying system 100.

Operation 680 begins at block 682 where the mapping operation initiates. Initiating operation 680 can be done in a number of different ways. As indicated by block 683, a user interacts with one or more user interface mechanisms 128 to initiate the mapping operation. For instance, the user actuates a button on a component of spraying system 100. As indicated by block 684, the user utilizes a mobile device or some other remote device to initiate the mapping process. For instance, the user utilizes a mobile device application to begin mapping operation 680. Of course, the mapping operation can be initiated in other ways as well as indicated by block 685.

Operation 680 proceeds at block 686 where a gesture or voice command is recorded or selected. As indicated by block 687, the control action is recorded, that is, the user completes the gesture or voice command and the sensor signal readings during the completion of the action is saved. For example, a user makes a gesture and the sensor signals obtained during the gesture making are used to create gesture data 162 in datastore 160. As indicated by block 688, a user selects the gesture or voice command from a list of possible actions. For instance, a user selects a gesture from a list of gestures which amongst other gestures includes vertical shaking, horizontal shaking, clockwise X-axis rotation, Y-axis rotation, counterclockwise Z-axis rotation. The gesture or voice command can be chosen in other ways as well, as indicated by block 689.

Operation 680 proceeds at block 690 where the gesture or voice command selected or recorded in block 594 is mapped to (e.g., set to correspond to) a control signal by one or more of gesture setting logic 154 and/or voice command setting logic 155.

Control signals can be defined into different types, as indicated by block 691. Some example control signal types include, increasing pressure, decreasing pressure, beginning recirculation, ending recirculation, entering cleaning mode, entering spraying mode, powering down the paint system, changing temperature, changing a plural component ratio, etc.

Of course, some of these control signals are modified by a degree as well, as indicated by block 692. For instance, increasing the pressure increases the pressure by a different amount based on some characteristic of the control action (e.g., speaking a number in a voice command or modifying the force or degree of rotation of a gesture). A control signal can be defined in other ways as well, as indicated by block 693. For example, a control signal is associated with a hazard, such that it requires secondary confirmation to proceed. For instance, turning a pump off is not considered as hazardous as turning a pump on and, as such, to turn the pump on requires a secondary voice command, gesture or control action that turning the pump off does not require.

Operation 680 proceeds at block 694 where the user is notified if the mapping was successful or not. A notification can include audible, haptic, or visual feedback to the user.

At least some examples are described herein in the context of applying a coating material, such as paint, to a surface. As used herein, paint includes substances composed of coloring matter or pigment suspending in a liquid medium as well as substances that are free of coloring matter or pigment. Paint can also include preparatory coatings, such as primers. Paint can be applied to coat a surface as a liquid or a gaseous suspension, for example, and the coating provided can be opaque, transparent, or semi-transparent. Some particular examples include, but are not limited to, latex paint, oil-based paint, stain, lacquers, varnish, inks, and the like. At least some examples can be applied in plural components systems. For example, multiple identification devices identify the plurality of components used in the plural component system.

It should also be noted that the different examples described herein can be combined in different ways. That is, parts of one or more examples can be combined with parts of one or more other examples. All of this is contemplated herein.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
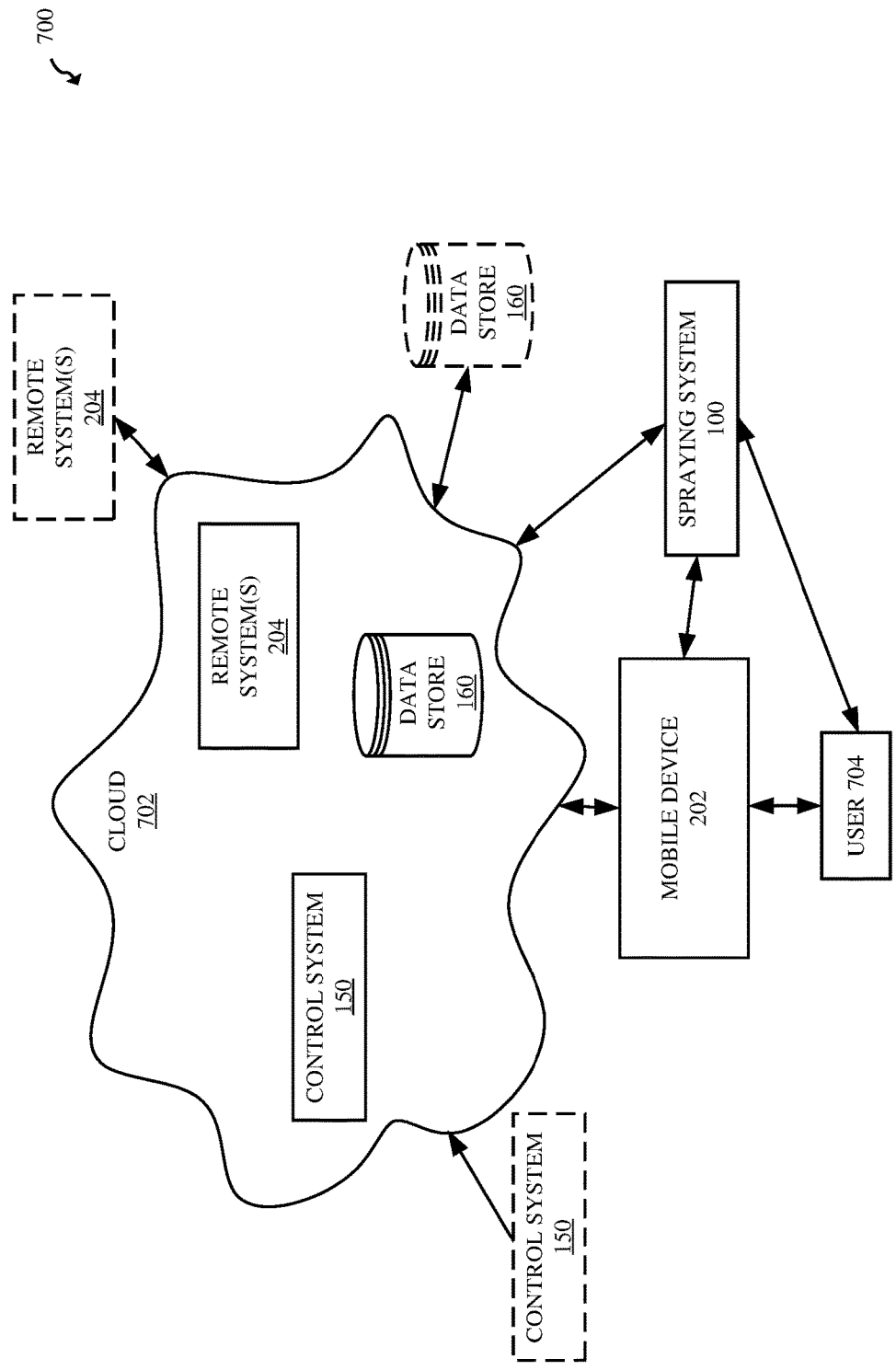
FIG. 7 shows one example of the architecture illustrated in FIG. 2, deployed in a remote server environment.

FIG. 7 is a block diagram of spraying system 100, shown in FIG. 2, deployed in a remote server architecture 700. In an example, remote server architecture 700 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 7, some items are similar to those shown in FIG. 2 and they are similarly numbered. FIG. 7 specifically shows that control system 150 can be located at a remote server location 702. Alternatively, or in addition, one or more of remote systems 204 and/or data stores 160 can be located at the remote server location 702. Therefore, mobile device 202, control system 150, and other components access those systems through remote server location 702.

FIG. 7 also depicts another example of a remote server architecture. FIG. 7 shows that it is also contemplated that some elements of FIG. 2 are disposed at remote server location 702 while others are not. By way of example, control system 150 can be disposed at a location separate from location 702 and accessed through the remote server at location 702. Further, one or more of data stores 160 can be disposed at a location separate from location 702 and accessed through the remote server at location 702. Regardless of where they are located, they can be accessed directly by spraying system 100, through a network (either a wide area network or a local area network), they can be hosted at a remote site by a service, or they can be provided as a service, or accessed by a connection service that resides in a remote location.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
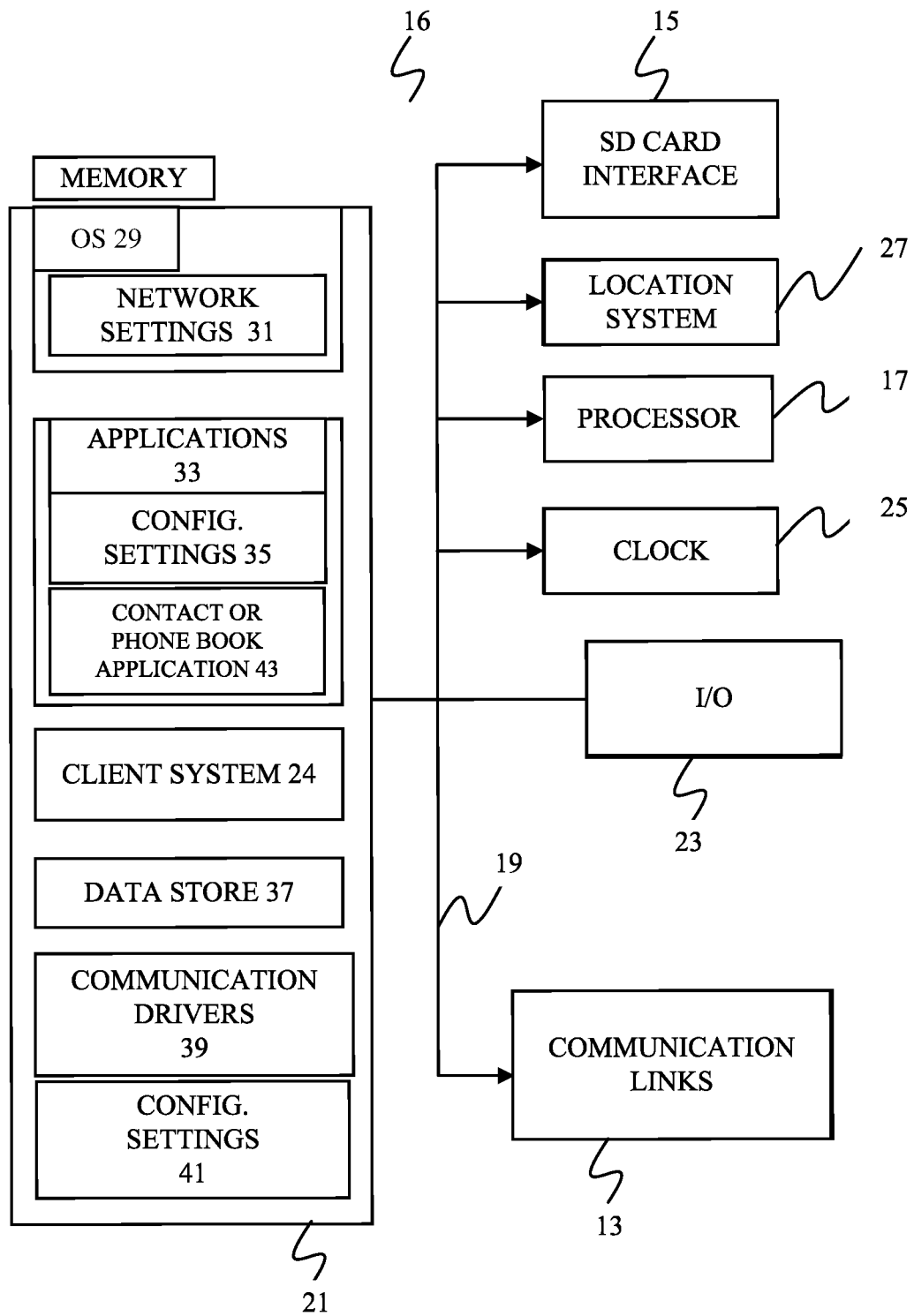
FIGS. 8-10 show examples of mobile devices that can be used as operator interface mechanisms in the architectures shown in the previous Figures.
Figure 9:
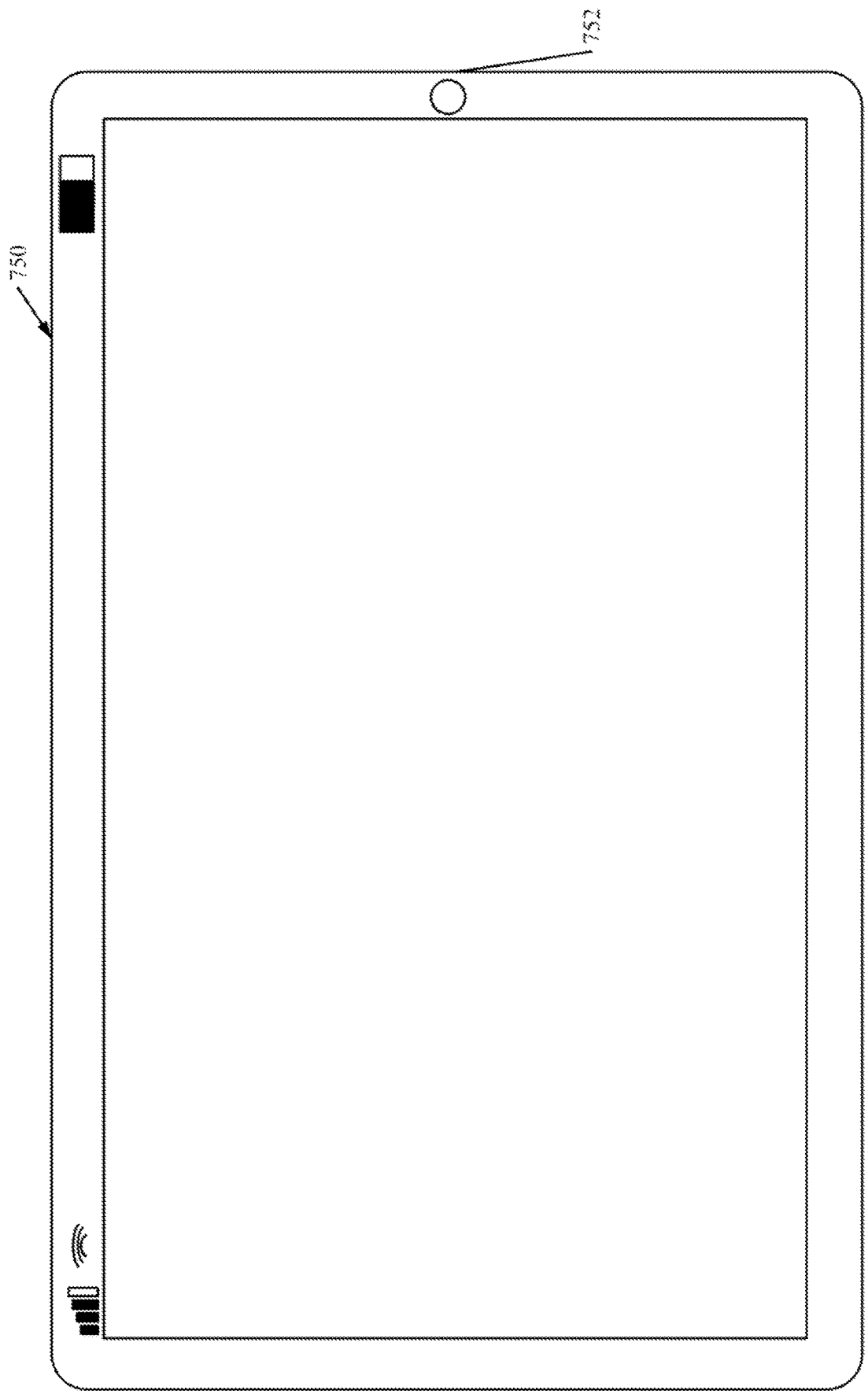
Figure 10:
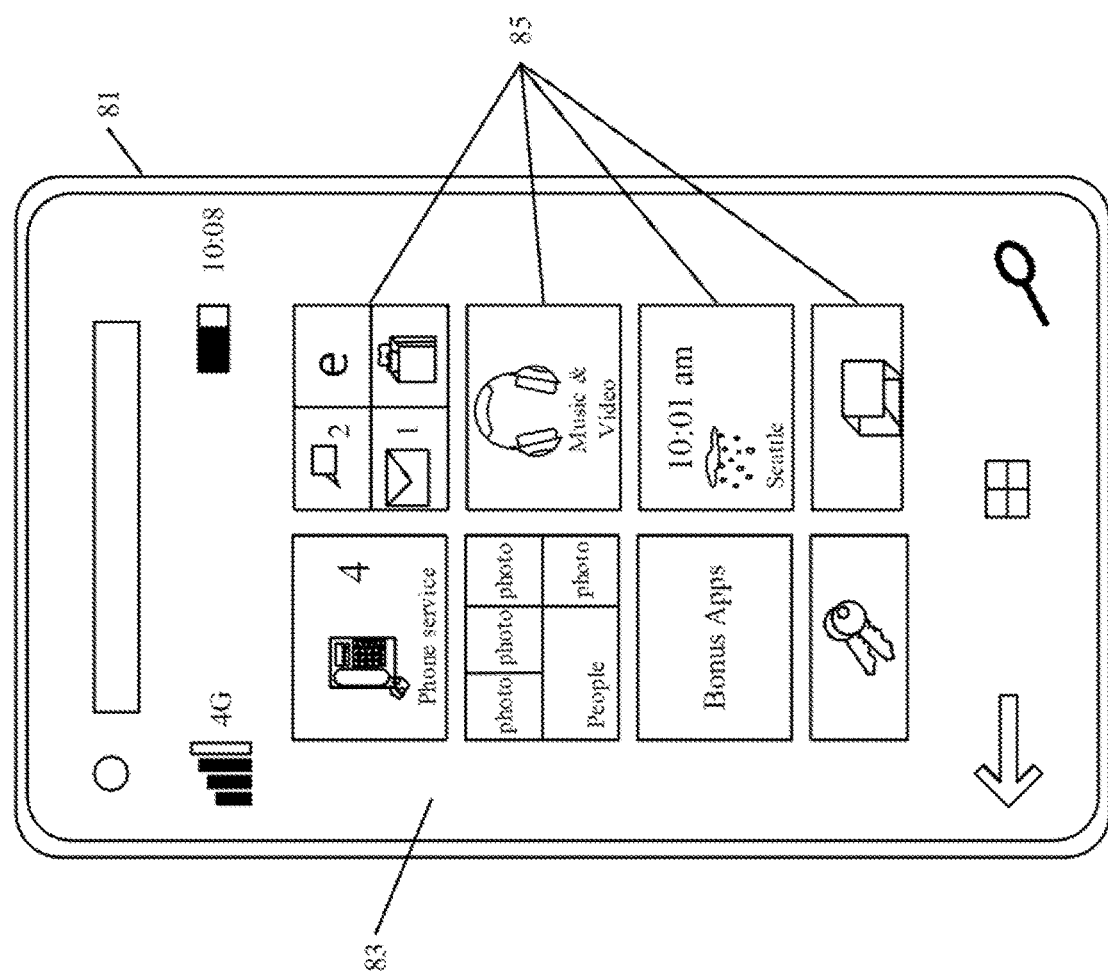

FIG. 8 is a simplified block diagram of one illustrative example of a handheld or mobile computing device that can be used as a user's or client's hand held device 16, in which the present system (or parts of it) can be deployed. FIGS. 9-10 are examples of handheld or mobile devices.

FIG. 8 provides a general block diagram of the components of a client device 16 that can run some components shown in FIG. 2, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 9 shows one example in which device 16 is a tablet computer 750. In FIG. 9, computer 750 is shown with user interface display screen 752. Screen 752 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 750 can also illustratively receive voice inputs as well.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
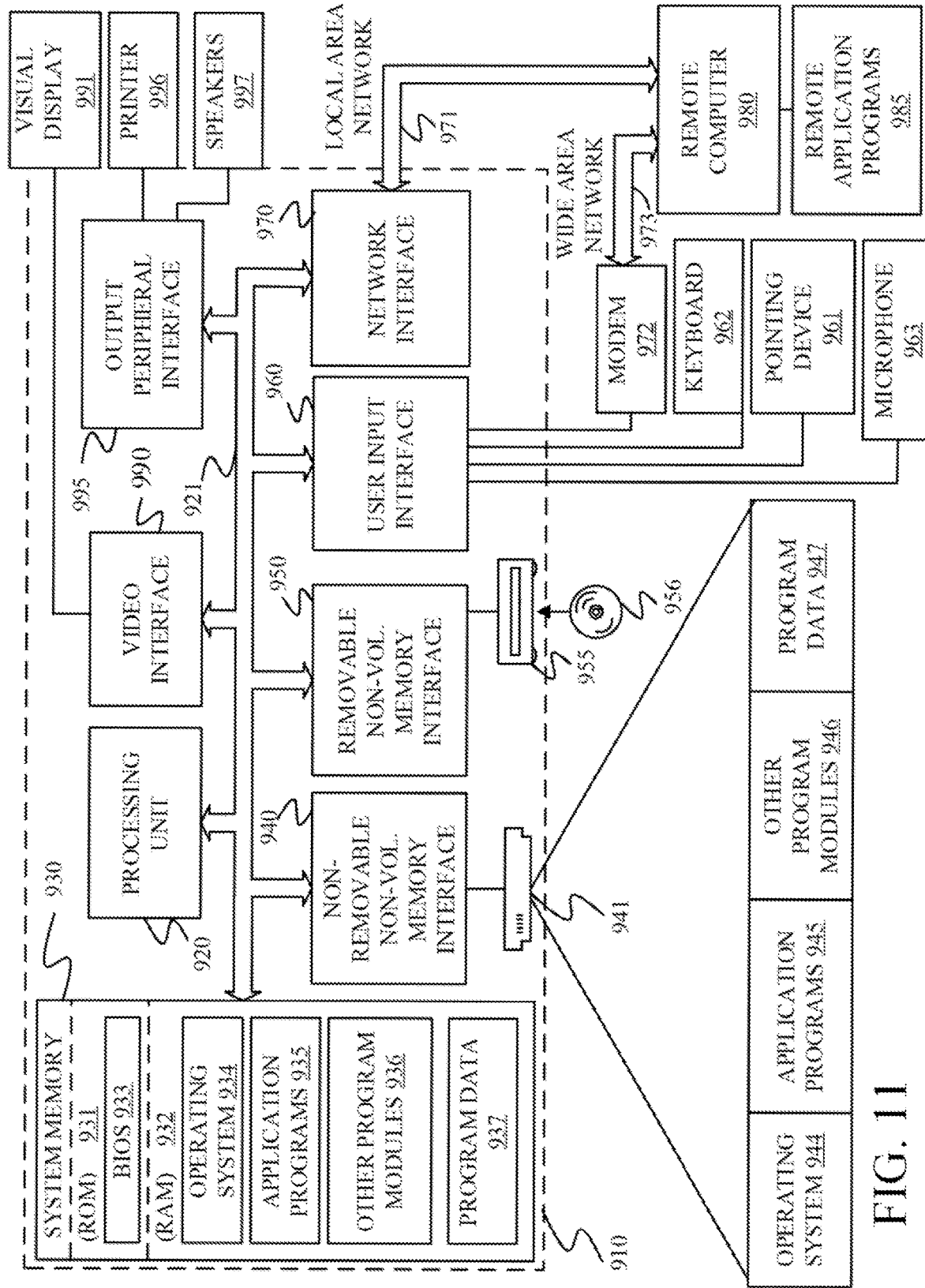
FIG. 11 is a block diagram showing one example of a computing environment that can be used in the architectures shown in the previous Figures.

FIG. 11 is one example of a computing environment in which elements of FIG. 2, or parts of it, (for example) can be deployed. With reference to FIG. 11, an example system for implementing some embodiments includes a computing device in the form of a computer 910. Components of computer 910 may include, but are not limited to, a processing unit 920 (which can comprise processors or servers from previous FIGS.), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. Memory and programs described with respect to FIG. 2 can be deployed in corresponding portions of FIG. 11.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory such as read only memory (ROM) 931 and random-access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 10 illustrates operating system 934, application programs 935, other program modules 936, and program data 937.

The computer 910 may also include other removable/non-removable volatile/nonvolatile computer storage media. By way of example only, FIG. 11 illustrates a hard disk drive 941 that reads from or writes to non-removable, nonvolatile magnetic media, an optical disk drive 955, and nonvolatile optical disk 956. The hard disk drive 941 is typically connected to the system bus 921 through a non-removable memory interface such as interface 940, and optical disk drive 955 is typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 910. In FIG. 11, for example, hard disk drive 941 is illustrated as storing operating system 944, application programs 945, other program modules 946, and program data 947. Note that these components can either be the same as or different from operating system 934, application programs 935, other program modules 936, and program data 937.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures. A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections (such as a local area network—LAN, or wide area network—WAN or a controller area network—CAN) to one or more remote computers, such as a remote computer 980.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. In a networked environment, program modules may be stored in a remote memory storage device. FIG. 11 illustrates, for example, that remote application programs 985 can reside on remote computer 980.

It should also be noted that the different examples described herein can be combined in different ways. That is, parts of one or more examples can be combined with parts of one or more other examples. All of this is contemplated herein.

Example 1 is a fluid application system comprising:
a pump unit configured to pump a fluid to a fluid applicator;
a sensor configured to sense a motion made by a user and generate a sensor signal indicative of the sensed motion;
a control system configured to:
identify a gesture based on the sensor signal; and
control the fluid application system based on the identified gesture.

Example 2 is the fluid application system of any or all previous examples, wherein the sensor is coupled to the fluid applicator.

Example 3 is the fluid application system of any or all previous examples, wherein the sensor comprises an IMU.

Example 4 is the fluid application system of any or all previous examples, wherein the sensor comprises a camera.

Example 5 is the fluid application system of any or all previous examples, wherein the control system controls the spraying system by changing a pressure of the pump unit.

Example 6 is the fluid application system of any or all previous examples further comprising a user interface device and wherein the control system controls the spraying system based on an actuation of the user interface device.

Example 7 is the fluid application system of any or all previous examples, wherein the motion made by the user comprises a voice command and a gesture.

Example 8 is the fluid application system of any or all previous examples wherein the spraying system comprises a plural component spaying system and the control system controls one of the following: a heating element or a ratio mix.

Example 9 is the fluid application system of any or all previous examples, wherein the identified gesture comprises a rotation of the fluid applicator.

Example 10 is the fluid application system of any or all previous examples, wherein the control system determines a degree of rotation based on the sensor signal and the control system controls the spraying system based on the degree of rotation.

Example 11 is the fluid application system of any or all previous examples, wherein the identified gesture comprises a shaking of the fluid applicator.

Example 12 is the fluid application system of any or all previous examples, wherein the control system determines a shake force based on the sensor signal and the control system controls the spraying system based on the shake force.

Example 13 is a method of controlling a spraying system, the method comprising:
sensing a gesture made by a user;
generating a sensor signal indicative of the gesture;
identifying a control signal corresponding to a stored gesture based on the sensor signal; and
controlling the spraying system based on the control signal.

Example 14 is the method of any or all previous examples, further comprising alerting the user the spraying system is being controlled based on the control signal.

Example 15 is the method of any or all previous examples, wherein sensing the gesture made by the user comprises: receiving user input on a user interface mechanism prior to sensing the gesture.

Example 16 is the method of any or all previous examples, further comprising:
determining a characteristic of the gesture made by the user based on the sensor signal; and
wherein controlling the spraying system is based on the characteristic of the gesture.

Example 17 is the method of any or all previous examples, wherein the gesture comprises a rotation and the characteristic of the gesture comprises an angle of rotation.

Example 18 is the method of any or all previous examples, further comprising:
sensing a custom gesture made by the user;
generating a custom gesture sensor signal indicative of the custom gesture;
associating the custom gesture sensor signal to a control signal; and
wherein identifying the control signal corresponding to the stored gesture comprises comparing the sensor signal to the custom gesture sensor signal.

Example 19 is a control system for a fluid application system comprising:
sensor interface logic configured to receive a sensor signal from a motion sensor;
gesture identification logic configured to identify a gesture based on the sensor signal; and
control signal generator configured to send a control signal to control the fluid application system based on the gesture.

Example 20 is the control system of any or all previous examples, wherein the gesture identification logic identifies the gesture by accessing a datastore and comparing the sensor signal to predefined gesture data in the datastore.

Although the subject matter has been described in language specific to structural features and/or methodological acts, it is to be understood that the subject matter defined in the appended claims is not necessarily limited to the specific features or acts described above. Rather, the specific features and acts mentioned above are disclosed as example forms of implementing the claims.

What is claimed is:
1. A fluid application system comprising:
a handheld fluid applicator comprising:
an outlet configured to apply a fluid to a surface; and
a motion sensor configured to:
sense a motion of the handheld fluid applicator, and
generate a motion signal indicative of the motion;
a pump unit configured to pump the fluid along a fluid path to the outlet; and
a control system configured to:
identify a gesture based on the motion signal;
identify a control action associated with the gesture based on association data, wherein the association data associates each respective gesture, in a set of gestures, with an associated control action; and
control a characteristic of the fluid pumped along the fluid path based on the control action.

2. The fluid application system of claim 1, wherein the characteristic of the fluid comprises at least one of:
a pressure of the fluid,
a temperature of the fluid, and
a flow rate of the fluid.

3. The fluid application system of claim 1, wherein the motion sensor comprises at least one of:
a gyroscope,
an accelerometer, or
an inertial measurement unit (IMU).

4. The fluid application system of claim 1, wherein the handheld fluid applicator comprises a spray gun, and wherein the control action is configured to set a pressure of the fluid pumped by the pump unit.

5. The fluid application system of claim 1, wherein the handheld fluid applicator comprises a plural component gun configured to mix two or more fluid components, and wherein the control action is configured to set at least one of:
a temperature of at least one fluid component of the two or more fluid components; or
a ratio mix of the two or more fluid components.

6. The fluid application system of claim 1, and further comprising:
a user input mechanism configured to receive a gesture control mode user input, wherein the control system is configured to activate a gesture control mode based on the gesture control mode user input and to control the characteristic of the fluid based on the activation of the gesture control mode.

7. The fluid application system of claim 1, wherein the control system is configured to define a control value for the characteristic of the fluid based on a magnitude of an aspect of the motion.

8. The fluid application system of claim 7, wherein the magnitude of the aspect of the motion comprises a shake force applied by a user to the handheld fluid applicator.

9. The fluid application system of claim 7, wherein the magnitude of the aspect of the motion comprises a degree of rotation of the handheld fluid applicator made by a user about one or more axes.

10. The fluid application system of claim 1, wherein the control action comprises at least one of:
begin a recirculation operation,
end a recirculation operation,
enter a cleaning mode,
enter a spraying mode, or
power down the fluid application system.

11. The fluid application system of claim 1, wherein the control system is configured to provide a notification to a user indicative of the control action.

12. The fluid application system of claim 11, wherein the notification comprises one or more of audible feedback or haptic feedback.

13. A method of controlling a fluid application system having a handheld fluid applicator and a pump unit, the method comprising:
sensing a motion of the handheld fluid applicator made by a user;
generating a motion signal indicative of the motion;
identifying a gesture based on the motion signal;
identifying a control action associated with the gesture based on association data, wherein the association data associates each respective gesture, in a set of gestures, with an associated control action; and
based on the control action, controlling a characteristic of a fluid pumped by the pump unit along a fluid path to the handheld fluid applicator.

14. The method of claim 13, further comprising alerting the user that the characteristic of the fluid is being controlled based on the gesture.

15. The method of claim 13, further comprising:
determining a characteristic of the motion made by the user based on the motion signal; and
determining a magnitude of a change to the characteristic of the fluid based on the characteristic of the motion.

16. The method of claim 15, wherein the gesture comprises a rotation of the handheld fluid applicator and the characteristic of the motion comprises an angle of rotation.

17. The method of claim 13, further comprising:
activating a custom gesture definition mode based on user input;
defining, based on the activation of the custom gesture definition mode, a custom gesture that includes:
a defined motion of the handheld fluid applicator, and
a corresponding control action that is mapped to the defined motion; and
generating the association data to include the custom gesture.

18. A fluid spraying system comprising:
a handheld fluid sprayer comprising a control mechanism and a spray outlet configured to spray a fluid;
a pump unit configured to pump the fluid along a fluid path to the spray outlet; and
a control system configured to:
detect user actuation of the control mechanism on the handheld fluid sprayer;
based on the user actuation of the control mechanism, activate a voice control mode; and
based on the activation of the voice control mode, detect a user voice command and control a characteristic of the fluid pumped along the fluid path based on the user voice command.

19. The fluid spraying system of claim 18, wherein the control mechanism comprises at least one of a button or a switch on the handheld fluid sprayer.

20. The fluid spraying system of claim 18, wherein the control mechanism comprises a trigger that controls fluid flow from the spray output, and the control system is configured to deactivate the voice control mode when fluid is being actively sprayed from the spray outlet.

* * * * *